United States Patent [19]
Hattori et al.

[11] Patent Number: 5,689,316
[45] Date of Patent: Nov. 18, 1997

[54] DEPTH SAMPLING THREE-DIMENSIONAL IMAGE DISPLAY APPARATUS

[75] Inventors: Tomohiko Hattori, Nagoya, Japan; David F. McAllister, Cary, N.C.; Sadayuki Sakuma, Nagoya, Japan

[73] Assignee: Terumo Kabushiki Kaisha, Tokyo, Japan

[21] Appl. No.: 588,364

[22] Filed: Jan. 18, 1996

Related U.S. Application Data

[63] Continuation of Ser. No. 245,073, May 17, 1994, abandoned, which is a continuation of Ser. No. 816,497, Jan. 8, 1992, abandoned.

[51] Int. Cl.$^6$ .................. G02F 1/1347; G02F 1/1333
[52] U.S. Cl. .................. 349/74; 349/86; 349/15
[58] Field of Search .................. 359/53, 51, 52, 359/40, 41, 478, 479; 349/74, 86, 15

[56] References Cited

U.S. PATENT DOCUMENTS

| | | | |
|---|---|---|---|
| 4,472,737 | 9/1984 | Iwasaki | 358/88 |
| 4,613,207 | 9/1986 | Fergason | 359/41 |
| 4,886,343 | 12/1989 | Johnson | 359/68 |
| 4,978,202 | 12/1990 | Yang | 359/63 |
| 5,061,041 | 10/1991 | Fergason | 359/51 |
| 5,113,272 | 5/1992 | Reamey | 359/51 |
| 5,144,482 | 9/1992 | Gould | 359/478 |
| 5,257,130 | 10/1993 | Monroe | 359/478 |

FOREIGN PATENT DOCUMENTS

| | | |
|---|---|---|
| 0195584 | 9/1986 | European Pat. Off. . |
| 741750 | 6/1935 | France . |
| 54-111846 | 9/1979 | Japan .................. 359/40 |
| 63-039299 | 2/1988 | Japan . |
| WO 91/15930 | 10/1991 | WIPO . |

OTHER PUBLICATIONS

T. Hattori, "Spatial Modulation Display Using Spatial Light Modulators," Optical Engineering, vol. 31, No. 2, Feb. 1992, Bellingham, pp. 350–352.

French Preliminary Search Report dated Nov. 27, 1995.

*Primary Examiner*—William L. Sikes
*Assistant Examiner*—Charles Miller
*Attorney, Agent, or Firm*—Morrison & Foerster LLP

[57] ABSTRACT

A depth sampling three-dimensional image display apparatus is capable of displaying a three-dimensional image without use of glasses. The apparatus includes a collimated light projecting device for projecting collimated light and an object of observation which passes substantially all components of the collimated light without inducing refraction or diffraction, and which has written therein information without inducing refraction or diffraction of the collimated light representative of a three-dimensional image. The apparatus further includes a large-diameter convex condenser for concentrating the light passed through the object of observation, a spatial filter which obstructs passage of light only in an area including the optical axis and the vicinity thereof to eliminate the straight-flow component of the light introduced via the large-diameter convex condenser, and a large-diameter convex imaging lens for focusing the light passed through the spatial filter to form a three-dimensional image.

9 Claims, 6 Drawing Sheets

DEPTH SAMPLING THREE-DIMENSIONAL IMAGE DISPLAY APPARATUS

This application is a continuation of U.S. application Ser. No. 08/245,073, filed May 17, 1994, now abandoned, which is a continuation of U.S. application Ser. No. 07/816,497, filed Jan. 8, 1992, abandoned.

BACKGROUND OF THE INVENTION

This invention relates to a depth sampling three-dimensional display apparatus. More particularly, this invention relates to a depth sampling three-dimensional image display apparatus which is useful for observation of X-ray images, CT images, and US images in the medical field and finds utility in all types of three-dimensional image systems necessitating real-time accurate information on three-dimensional positional relations such as the radar images for aviation control.

Examples of prior art three-dimensional image systems include the depth sampling method which employs a varifocal mirror, a rotary cylinder, a display surface layer, a half mirror synthesizer, and a display surface vibrator. Another prior art system is the method of multiple holography. These prior art systems have been applied primarily to the medical field. Since these methods inherently incorporate a drive part, they have various drawbacks including generation of flickers in an image, difficulties encountered in effecting real-time display, and large physical size. These drawbacks have prevented the prior art methods from being utilized for full-scale commercial applications.

SUMMARY OF THE INVENTION

An object of this invention, therefore, is to provide a depth sampling three-dimensional image display apparatus which enables a number of spectators to simultaneously observe a displayed image, and to move their points of view, without requiring the use of the glasses normally encountered in conventional three-dimensional display systems. A further object of the invention is to produce a display image capable of being seen through what is known as a phantom image, which obviates the necessity of a movable component such as a varifocal mirror, and allows real-time display of an image.

To accomplish the objects described above, the present invention relates to a depth sampling three-dimensional image display apparatus, comprising: collimated light projecting means for projecting fully collimated light; an object of observation which passes virtually all components of the collimated light from the collimated light projecting means without inducing refraction or diffraction, wherein the object of observation has written therein information for causing scattering, without inducing refraction or diffraction, of said collimated light representative of a three-dimensional image; condenser means for concentrating light passed by the object of observation; filter means for eliminating a direct-flow component of light projected thereon through the condenser means; and imaging means for forming a three-dimensional image from light passed through the filter means.

According to a preferred embodiment, the object of observation is a transmission-type spatial modulating element constructed three-dimensionally so as to enable the information for display of a three-dimensional image to be sequentially rewritten by electrooptical control means.

According to another embodiment, the invention relates to a depth sampling three-dimensional image display apparatus, comprising: collimated light projecting means for projecting collimated light comprising monochromic light of red, blue, and green; a plurality of objects of observation which pass virtually all components of the collimated light from the collimated light projecting means without inducing refraction or diffraction, wherein the objects of observation have written therein information for causing scattering, without inducing refraction or diffraction, of said collimated light representative of a three-dimensional image a plurality of convex condensers adapted to concentrate light passed by said objects of observation, synthesizing means for synthesizing light from the convex condensers, and a plurality of imaging convex lenses for focusing light from the synthesizing means for and consequently forming a color three-dimensional image.

According to a preferred construction of the above embodiment, the objects of observation are each a transmission type spatial modulating element constructed three-dimensionally in such a manner as to enable the information for display of a three-dimensional image to be sequentially rewritten by an electrooptical control means.

DETAILED DESCRIPTION

The depth sampling three-dimensional image display apparatus of the invention will now be described with reference to the accompanying figures.

Figure 1:
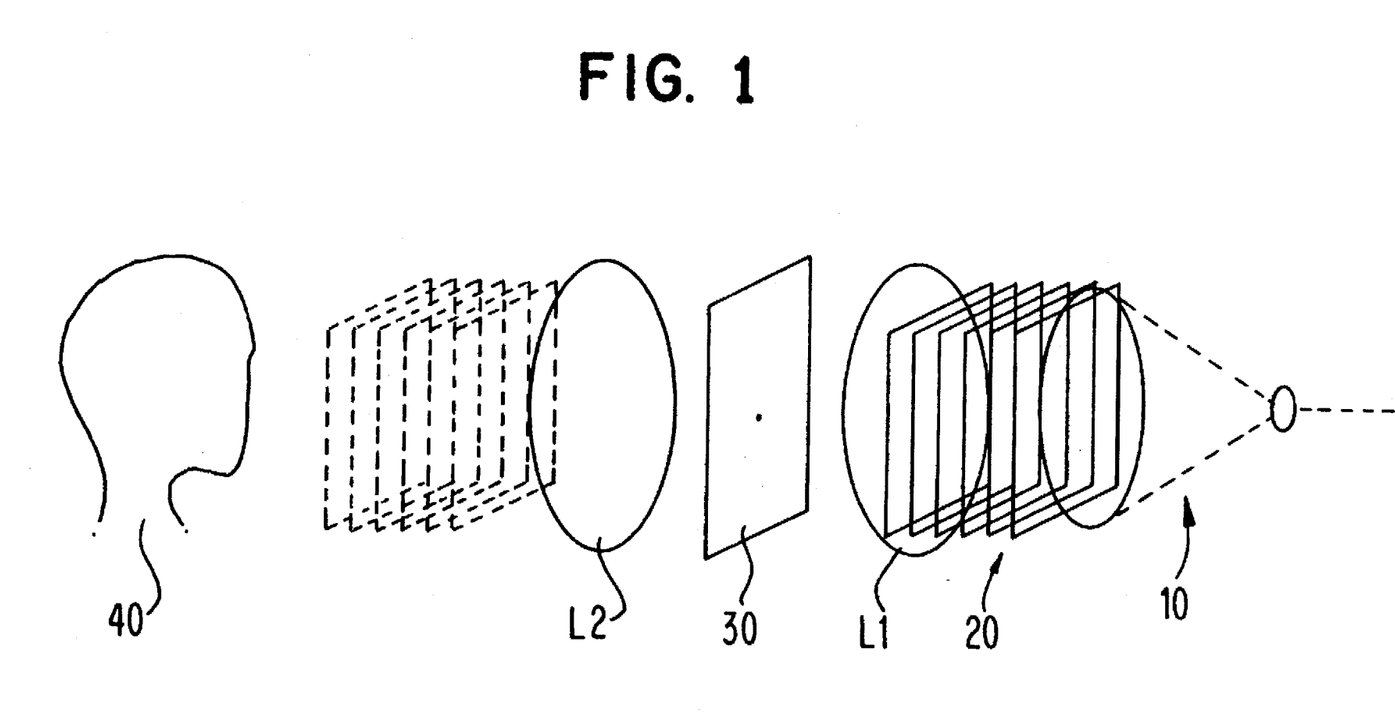
FIG. 1 is a diagram illustrating the operating principle of a depth sampling three-dimensional image display apparatus according with the present invention.

A collimated light projecting means 10, as illustrated in FIG. 1, is composed of a laser generator for generating a laser beam and a beam expander for expanding the diameter of the laser beam. The expanded laser beam forms a collimated light. An object of observation 20 is a three-dimensionally constructed object which is perfectly transparent to unaided eyes and is capable of causing the majority of components of light to advance straight therethrough without inducing random scattering of light due to refraction or diffraction. This object of observation 20 has written therein the information for causing scattering, without inducing refraction or diffraction, of the light introduced for display of a three-dimensional image.

A large-diameter convex condenser L1 concentrates on a spatial filter 30 the light which has passed through the object of observation 20. The spatial filter 30 is so constructed that where the light passed straight through the object of observation 20 is focused by virtue of the large-diameter convex condenser L1, passage of the light is obstructed only in the part thereof inclusive of the focal point and the vicinity thereof. A large diameter imaging convex lens L2 by which the direct-flow component of light is to be eliminated causes only the light which has been introduced via the spatial filter 30 and slightly scattered by the object of observation 20 to be focused within the empty space in front thereof and consequently offers a three-dimensional image to a spectator 40 seated in front of the empty space.

Figure 2:
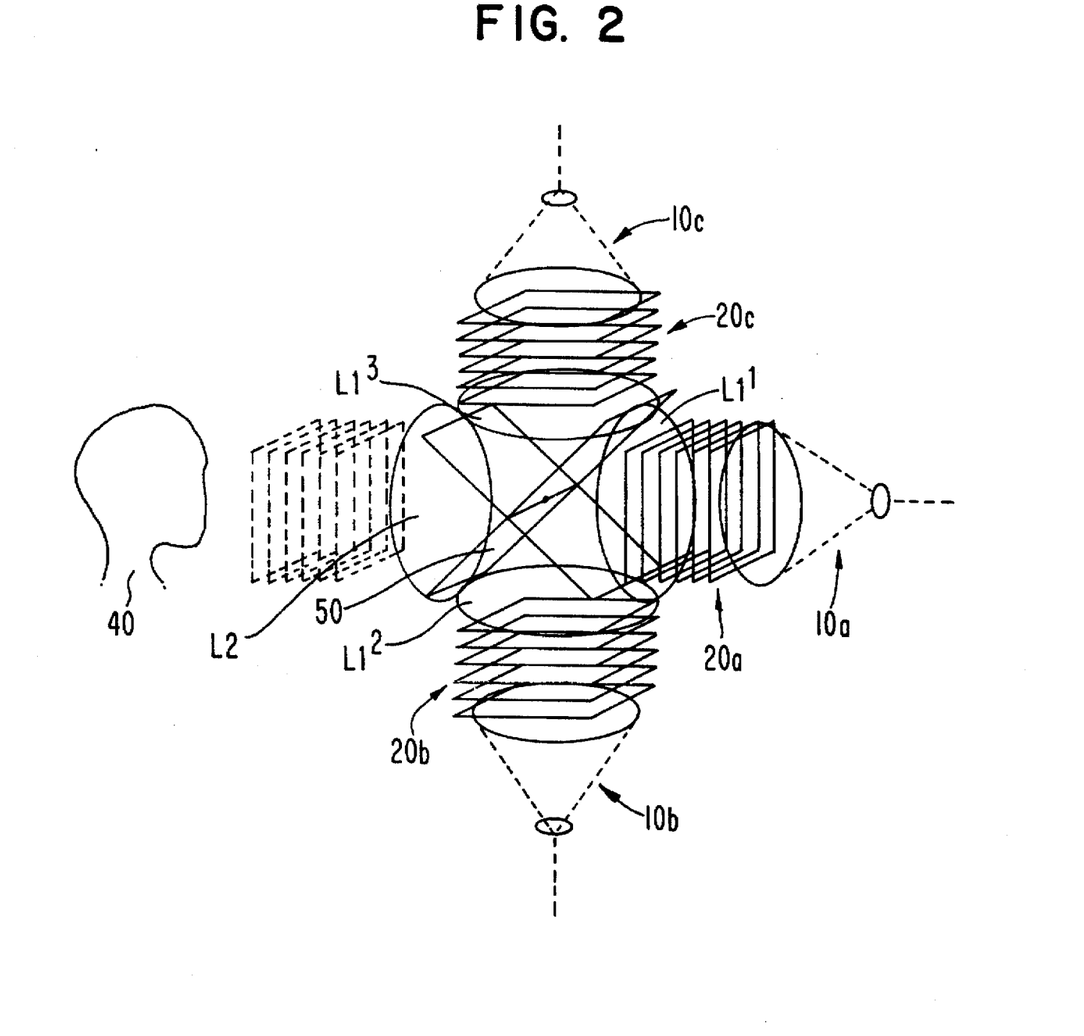
FIG. 2 is a diagram illustrating the operating principle of a depth sampling three-dimensional image display apparatus of this invention realizing coloration of the image by the use of a beam splitter.

The object of observation mentioned above may be transmission type spatial modulating elements. These spatial modulating elements enable the information for the formation of the three-dimensional image on the front side of the empty space to be sequentially rewritten by electro-optical control means. These transmission type spatial modulating elements are constructed by superposing objects capable of real-time two-dimensional optical modulation and therefore are able to effect three-dimensional real-time modulation. By causing depth-sampled planar images to be severally written as they are rotated by 180 degrees in the spatial modulating elements, an accurately depth sampled three-dimensional image formed on the real time basis is offered for observation instead of a real-time moving object.

Where collimated light projecting means 10a, 10b, and 10c adapted to project the monochromic lights of red, blue, and green and objects of observation 20a, 20b, and 20c and large-diameter convex condensers L1-1, L1-2, and L1-3 constructed in the same manner as described above and disposed respectively opposite the collimated light projecting means are provided as illustrated in FIG. 2, synthetic means 50 using beam splitters, for example, synthesizes the lights from these large-diameter convex condensers. Then, the large-diameter imaging convex lens L2, in the same manner as described above, causes the light from the object of observation 20 to be focused again inside the empty space in front thereof and offers a three-dimensional image formed of the three primary colors of light, i.e. red, blue, and green, for the spectator 40 seated on the front side of the empty space.

Again in this case, by adopting transmission type spatial modulating elements adapted to operate in the same manner as described above as the objects of observation, it is possible to offer for observation a color three-dimensional image formed on a real time basis.

A preferred embodiment of the invention will now be described which represents a case in which a transmission type spatial modulating element is used as the object of observation 20.

Figure 3A:
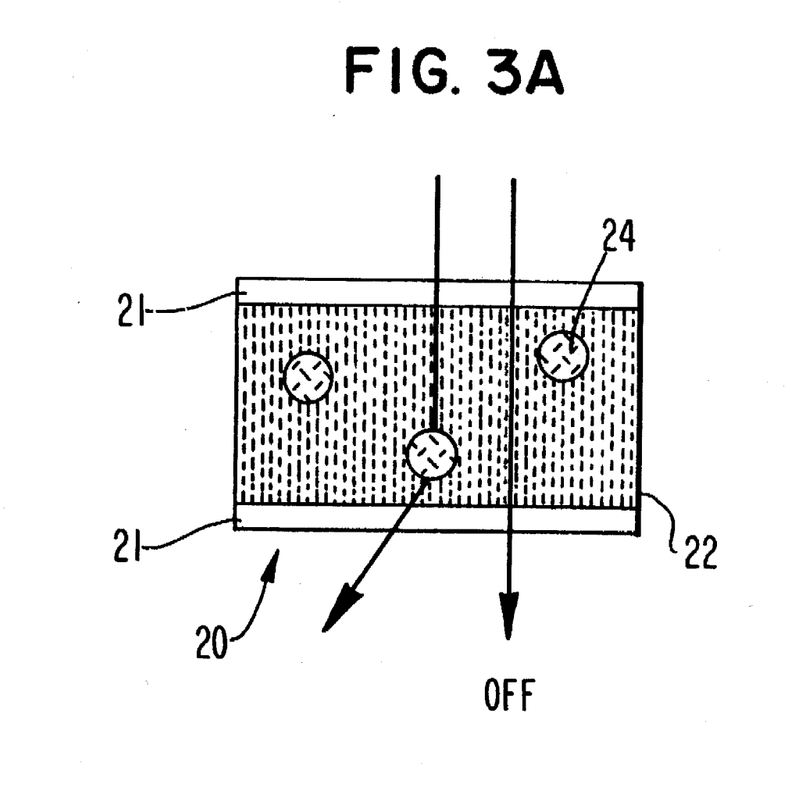
FIG. 3 is a diagram illustrating the operating principle of a transmission type spatial modulating element to be used in the apparatus of the present invention.
Figure 3B:
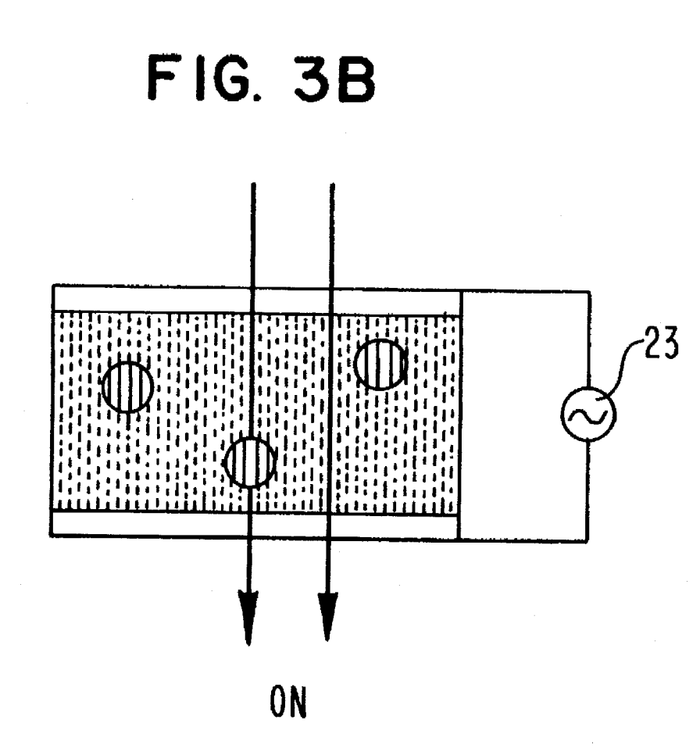

The spatial modulating element 20 is constructed by having a polymer 22 closely interposed between oppositely positioned transparent electrodes 21. Inside this polymer 22 is lodged a nematic liquid crystal 24 which is caused to refract or diffract pass the light introduced through the transparent electrode 21 in accordance with the condition of application of the voltage from an external power source 23. The basic operation and action of the spatial modulating element 20 are as described hereinbelow.

Let D stand for the probability with which the light introduced by one of the spatial modulating elements 20 used for writing a three-dimensional image advances in a straight manner while the spatial modulating elements 20 are cut off the external power source. In addition, let d stand for the probability with which the light is slightly scattered by the nematic liquid crystal 24. The relations, $D+d=1$ and $D \gg d$ will then be satisfied. On the assumption that the group of convex lenses used in a Schlieren optical system have a sufficiently large diameter, when the light is introduced in an amount of 1 to the object of observation 20, the component of the light which contributes to the construction of a three dimensional image in the first spatial modulating element is $d \times D^{n-1}$ in amount, wherein n stands for the number of these spatial modulating elements to be used in the object of observation. The amount of light on the second spatial modulating element is $D \times d \times D^{n-2}$ and the total component of the light contributing to the construction by all the spatial modulating elements is $D \times d \times D^{n-1}$ Here, the component of the light which advances straight through all the n elements is $D^n$ and the amount of the light which reaches the Spectator side is about $1-D^n$. Of the amount of the light reaching the spectator, the amount of light $n \times d \times D^n/(1-D^{n-1}) \times 100\%$ contributes to the construction of the three-dimensional image. Owing to the assumption described above, the magnitude of this amount approaches 100%. This fact indicates that always in the formation of the depth sampling image with n planar images, virtually all the light reaching the spectator is used for the construction of the three-dimensional image and the image thus formed has only small noise. During the observation of the three-dimensional image, therefore, since the images formed on the front members are not obstructed by the lights emitted from the images formed on the rear members, there is realized a phantom image in which the component images are seen through.

Figure 4:
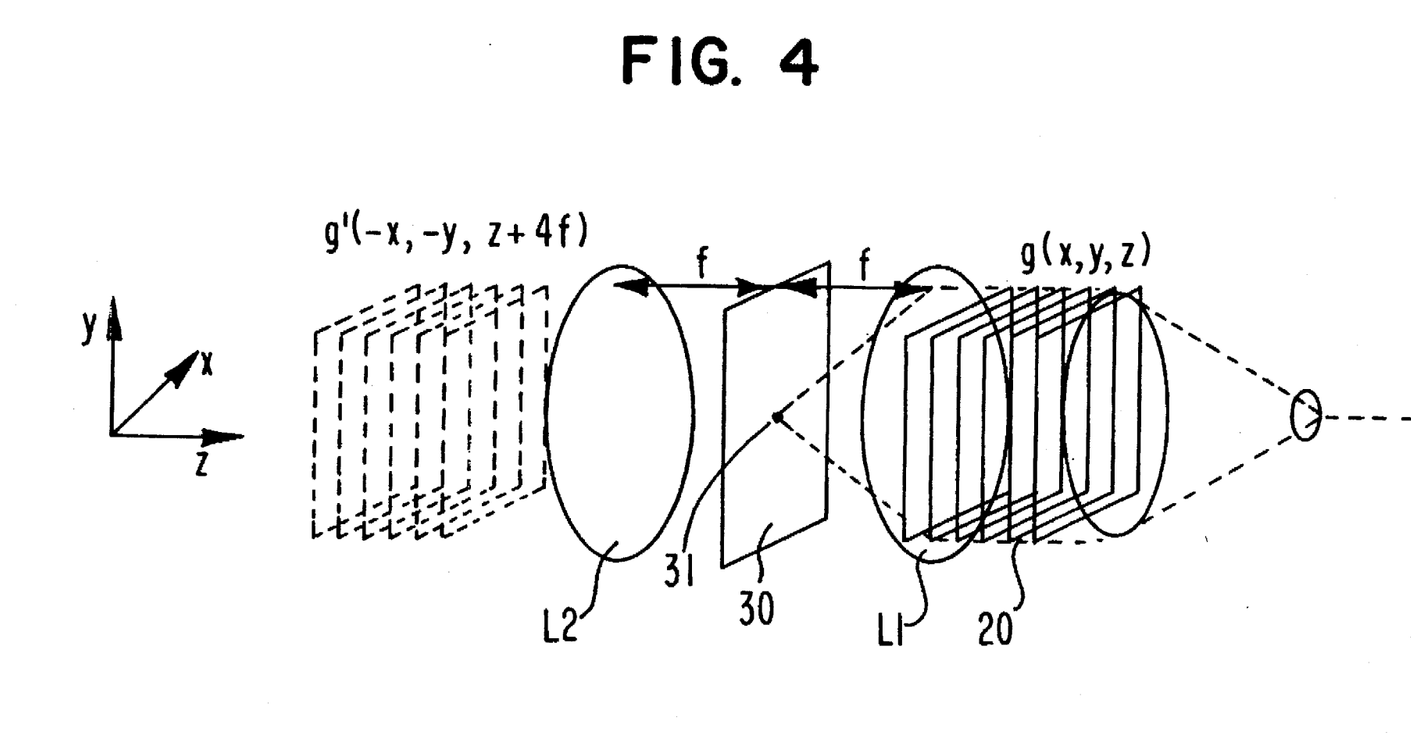
FIG. 4 is a diagram aiding in the illustration of the operation of the depth sampling three-dimensional image display apparatus of this invention.

The geometric positional relation of the three-dimensional image is as illustrated in FIG. 4. To be specific, the focal length of the large-diameter convex condenser L1 and that of the large-diameter convex imaging lens L2 are both f and the distance between these convex lenses is 2f. When the spatial filter 30 produced by pasting a small circular black metallic piece 31 to an opaque sheet glass of a smooth flat surface so as to obstruct passage of light only in the optical axis or the part inclusive of the optical axis and the vicinity thereof is interposed between the two convex lenses, the inscription of a three-dimensional information, g (x, y, z), in the object of observation 20, inverted images equally of g' (-x, -y, z+4f) are reproduced one each in the empty spaces before and behind the large-diameter convex imaging lens L2. The position in the direction of depth of the image introduced into the object of observation 20, therefore, is reproduced as moved per se over a distance of 4f toward the spectator's side. Here, the coincidence of g with g' means that the image, g (x, y, z), which is invisible with unaided eyes has been transformed into the aforementioned visible image, g' (-x, -y, z+4f). It is, therefore, necessary that the two-dimensional image remaining after exclusion of the depth information from the three-dimensional information for introduction into the object of observation 20 should be injected as rotated by 180 degrees or the object of observation 20 should be disposed in advance as rotated by 180 degrees relative to the optical axis. In the case of the spatial modulating element which is colored with a light of the status of complementary color, since the light is incapable of passing this element, it is only with difficulty that the group of elements serving herein as the object of observation 20 are used in a colored state. In the case of the three-dimensional image display apparatus which conforms to the present invention, therefore, the coloration of the three-dimensional image is attained by causing the three-dimensional images formed with three primary colors to be synthesized into one three-dimensional image.

Figure 5:
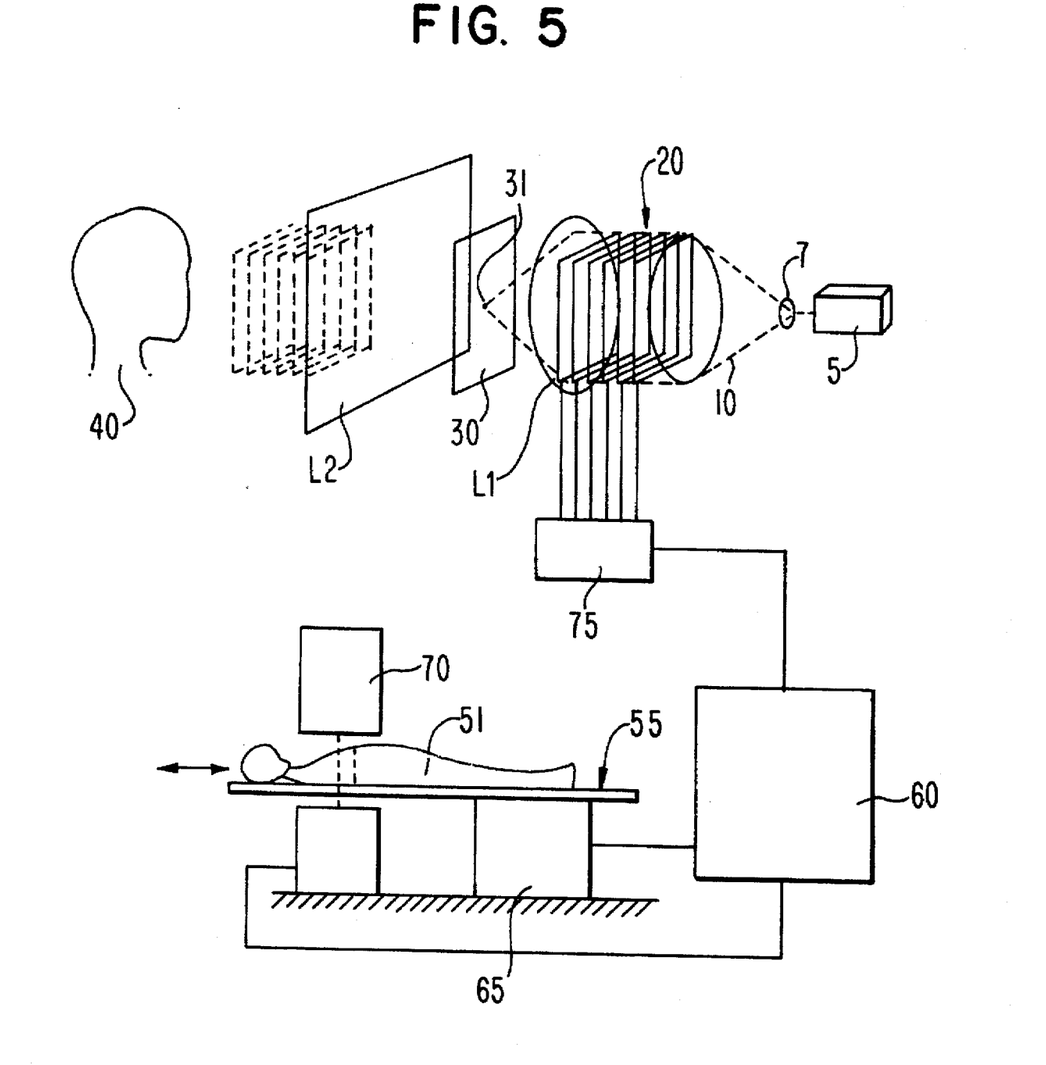
FIG. 5 is a structural diagram illustrating the apparatus of this invention applied to an X-ray CT.

FIG. 5 is a schematic explanatory diagram illustrating an embodiment of this invention in an X-ray CT device or a NMRCT. In the X-ray CT device, a subject of observation 51 is laid on a table 55. This table 55 can be moved by a drive device 65 in the direction of an arrow shown in the diagram in compliance with an instruction from the device proper 60. Further, the device proper 60 is adopted to photograph a cross-sectional image of the subject 51 positioned below a gantry 70 in accordance with an instruction. The cross-sectional image of the subject of observation 51 photographed by the device proper 60 is introduced via an image distributor 75 into one of liquid crystal TV 20 serving as the object of observation. The liquid crystal TV 20 consequently produces such information as to form a three-dimensional image based on the cross-sectional image. Then, the subject of observation 51 is slightly moved by the drive device 65 to a new position at which a cross-sectional image of the subject is to be photographed. This cross-sectional image is similarly introduced via the image distributor 75 into another liquid crystal TV 20. The operation just described is repeated until cross-sectional images photographed at different positions are severally introduced into the rest of the liquid crystal TVs.

In the optical system, the light emitted from the He—Ne laser generator 5 and subsequently converted into a collimated light of a diameter of 55 mm by the beam expander 7 is used for injection into the liquid crystal TV 20. As the liquid crystal TVs, five superposed 3-inch monochromic TVs each formed of a commercially available transmission type liquid crystal plate stripped of a polarizing filter are used as inversely disposed. A convex lens L1 having a diameter of 120 mm and a focal length of 200 mm is disposed in front of the liquid crystal TV 20. At a distance of 200 mm from the front surface of the convex lens L1, a commercially available glass sheet 30 having a black circular metallic piece 31 with a diameter of 0.5 mm pasted thereto at the optical axis is disposed. Then, at a distance of 200 mm from the front surface of the glass sheet, a Fresnel convex lens L2 having a focal distance of 200 mm and measuring 150 mm in width and 200 mm in length is disposed. In the liquid crystal TV 20, the information concerning the depth sampled cross-sectional images is represented as described above.

When the apparatus of the present invention is actuated as held in the condition described above, a three-dimensional image composed of 5 cross-sectional images of the subject of observation 51 is made to appear on the front surface of the Fresnel convex lens L2. Thus, the spectator 40 is allowed to have a three-dimensional look at the cross sections of the subject of observation 51 in the longitudinal direction.

Figure 6:
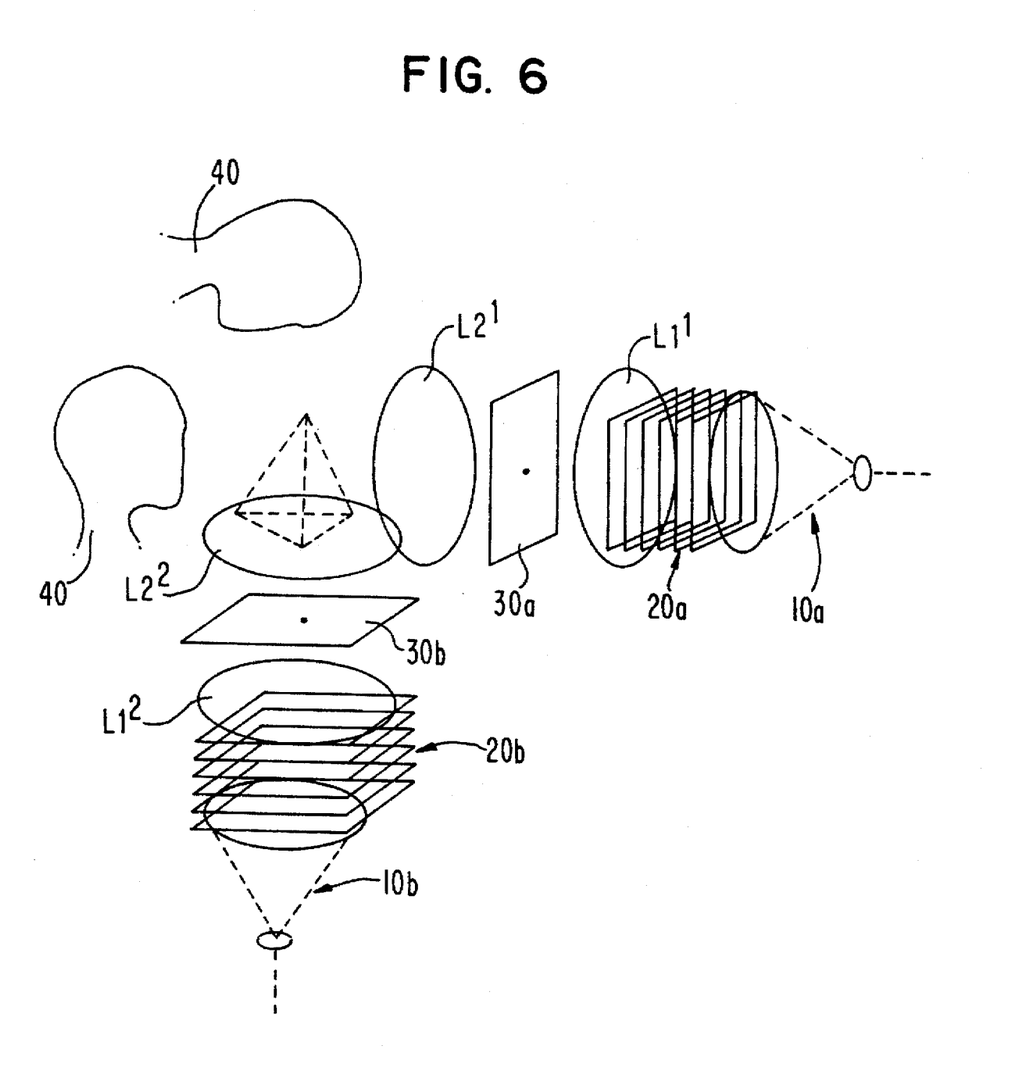
FIG. 6 is a diagram illustrating the operating principle of a perpendicular combination of depth sampling three-dimensional image display apparatuses of this invention for the formation of a three-dimensional image.

The present embodiment is not limited to a three-dimensional image display apparatus which allows the formed image to be observed only in one direction at a time. When a plurality of such three-dimensional image display apparatuses are set up perpendicularly to one another and the corresponding empty spaces for the formation of a three-dimensional image are combined likewise as illustrated in FIG. 6, one and the same three-dimensional image can be observed simultaneously from overlapping angles.

The present invention need not be limited to the embodiment described thus far. The spatial filter depicted in the preceding embodiments as means for the removal of the direct-flow component of the light is not limited to the sheet glass having the circular metallic piece pasted thereto in the part inclusive of the optical axis and the vicinity thereof. Optionally, a device which is adapted to make use of holography and consequently allowed to eliminate not only the direct-flow component but also the grid-like image formed by the transparent electrode such as is found in the spatial modulating element may be used instead.

The source for the collimated light need not be limited to the He—Ne laser generator described in the present embodiment. Any light source which is capable of generating a fully collimated light may be used instead. The use of the convex lens and the Fresnel convex lens described byway of illustration in the present embodiment is not critical. Optionally, other optical elements which are capable of forming a similar image may be used.

As described above, the present invention utilizes a three-dimensionally constructed object of observation as the object of observation in the schlieren optical system, produces a three-dimensional image resembling a phantom image which is seen through in the direction of depth, uses no moving component anywhere in the entire apparatus, ensures formation of a three-dimensional image not suffering emission of flicker or noise, and provides an infallible display of depth sampled three-dimensional image information. Further, by employing an electro-optical device for the object of observation, the apparatus of the present invention is able to effect real-time display of a three-dimensional image and attain coloration of the image easily without entailing the drawbacks inherent in conventional holography. Unlike the conventional techniques the present invention provides a virtually faultless depth sampling three-dimensional image display apparatus.

What is claimed is:

1. A depth sampling three-dimensional image real-time display apparatus, comprising:

collimated light projecting means configured to project substantially collimated monochromic light;

a stack of liquid crystal elements, each of which passes substantially all components of the collimated light from the collimated light projecting means without inducing refraction or diffraction, wherein an object of observation has written therein information for causing scattering of said collimated light representative of a three-dimensional image, and wherein:

D is the probability that a liquid crystal element passes light without inducing refraction or diffraction when no external voltage is applied to the liquid crystal element, d is the probability that light is scattered by the liquid crystal element, and each liquid crystal element satisfies the relations D+d=1 and D>>d;

condenser means for concentrating light passed by the stack of liquid crystal elements;

filter means for eliminating a direct-flow component of light projected thereon through the condenser means; and focalizing lens means for forming a three-dimensional image in an empty space from light passed through the filter means.

2. A depth sampling three-dimensional image real-time display apparatus according to claim 1, wherein said collimated light projecting means projects substantially collimates each monochromic light of three primary colors of light, red, blue, green.

3. A depth sampling three-dimensional image real-time display apparatus according to claim 1, wherein said transmissions-type spatial modulating element can be sequentially rewritten by electro-optical control means.

4. A depth sampling three-dimensional image real-time display apparatus according to claim 3, wherein said transmission type spatial modulating element can be two-dimensional optical modulated in real time.

5. A depth sampling three-dimensional image real-time display apparatus according to claim 3, wherein said transmission-type spatial modulating element can be three-dimensional, optical modulated in real time.

6. A depth sampling three-dimensional image real-time display apparatus, comprising:

a plurality of collimated light projecting means for projecting substantially collimated light, each of said light projecting means projecting either red, blue or green monochromic light;

a plurality of stacks of liquid crystals, each of said stacks being associated with one of the light projecting means and passing substantially all components of the collimated light from the collimated light projecting means without inducing refraction or diffraction, wherein an object of observation has written therein information for causing scattering of said collimated light representative of a three-dimensional image, and wherein:

D is the probability that a liquid crystal element passes light without inducing refraction or diffraction when no external voltage is applied to the liquid crystal element, d is the probability that light is scattered by the liquid crystal element, and each liquid crystal element satisfies the relations $D+d=1$ and $D>>d$;

a plurality of condenser means, each of said condenser means being associated with one of said stacks of liquid crystal elements for concentrating light passed by said one stack of liquid crystals, synthesizing and filter means for synthesizing light from the condenser means and eliminating a direct-flow component of light projected thereon through the condenser means, and focalizing lens means for forming a color three-dimensional image in an empty space from light passed through said synthesizing and filter means.

7. A depth sampling three-dimensional image real-time display apparatus according to claim 6, wherein said transmission-type spatial modulating element can be two-dimensional optical modulated in real-time.

8. A depth sampling three-dimensional image real-time display apparatus according to claim 6, wherein said transmission-type spatial modulating element can be three-dimensional optical modulated in real-time.

9. A depth sampling three-dimensional image real-time display apparatus according to claim 6, wherein said transmission-type spatial modulating element can be sequentially rewritten by electro-optical control means.

* * * * *